(No Model.)
D. D. BUCKLES.
HORSE COLLAR PAD.
No. 419,030. Patented Jan. 7, 1890.
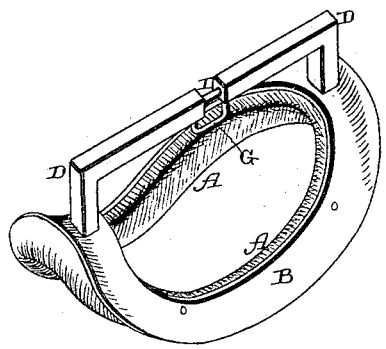
Witnesses:
E. P. Ellis
Allen S. Pattison
Inventor:
D. D. Buckles,
per F. A. Lehmann,
atty

UNITED STATES PATENT OFFICE.

DANIEL DEAN BUCKLES, OF JAMESTOWN, OHIO.

HORSE-COLLAR PAD.

SPECIFICATION forming part of Letters Patent No. 419,030, dated January 7, 1890.

Application filed September 27, 1889. Serial No. 325,312. (No model.)

*To all whom it may concern:*

Be it known that I, DANIEL DEAN BUCKLES, of Jamestown, in the county of Greene and State of Ohio, have invented certain new and useful Improvements in Horse-Collar Pads; and I do hereby declare the following to be a full, clear, and exact description of the invention, such as will enable others skilled in the art to which it pertains to make and use it, reference being had to the accompanying drawing, which forms part of this specification.

My invention relates to an improvement in horse-collar pads; and it consists of a pad formed in one continuous piece, which is cut away at its center, and which is provided with a bridge having a loop for the collar-strap to pass through and a loop for the hame-strap, as will be more fully described hereinafter.

The object of my invention is to provide a pad for horse-collars made in a single piece, but having its center cut away, so as to admit air freely to the horse's neck, and which rests upon the top of the neck at two different points, and which pad is designed to prevent the neck from becoming sore where the tongue of a wagon or plow is used.

The accompanying drawing represents a perspective of a pad which embodies my invention.

A represents the pad, which is made in one continuous circular piece, and which is secured in any suitable manner to the under side of the metallic plate B, which is bent into the form it is desired to have the pad retain. The entire central portion is cut away, so that the pad rests upon the top of the neck at two different points, allowing the air free access to the neck in between the two bearing-points. If the neck has become sore from the wear of the collar in the usual manner, this open space at the center of the pad allows free access to the sore and to allow the sore to be freely doctored while the horse is kept in constant use.

By making the pad in the circular form here shown and attaching it to a metallic plate only a single pad is necessary where two have been used heretofore, making the adjustment of the pad much simpler and easier and causing a uniform bearing upon the neck.

Extending across the opening at the center of the pad is the bridge D, which is provided with a loop G on its under side for the collar-strap to pass through, and a recess, loop, or other holding device upon its top for the hame-straps to catch in.

This pad serves to hold the collar and the hames up off the horse's neck and to form a much larger bearing for the neck and to distribute the weight of the collar and hames more uniformly upon the neck of the horse than can be done by the ordinary little pads which are usually placed inside of the collar.

A pad constructed as here shown will prevent the neck from becoming sore where the tongue of a wagon or plow is used, and will keep the collar off of the neck, so as to allow any sore made by the collar to be freely doctored even while the horse is kept hard at work.

Having thus described my invention, I claim—

A horse-collar pad consisting of a circular pad, a metallic plate secured to the outer surface thereof, both of which are cut away at their centers and shaped to conform to the neck of the horse, and a U-shaped bridge having its ends secured to the plate and provided with a loop at or near the center thereof for supporting the collar and hame straps above the horse's neck, substantially as shown and described.

In testimony whereof I affix my signature in presence of two witnesses.

DANIEL DEAN BUCKLES.

Witnesses:
 CHAS. CLARK,
 G. W. CLARK.